(No Model.) 4 Sheets—Sheet 1.
F. H. RICHARDS.
MECHANICAL MOVEMENT.
No. 401,371. Patented Apr. 16, 1889.
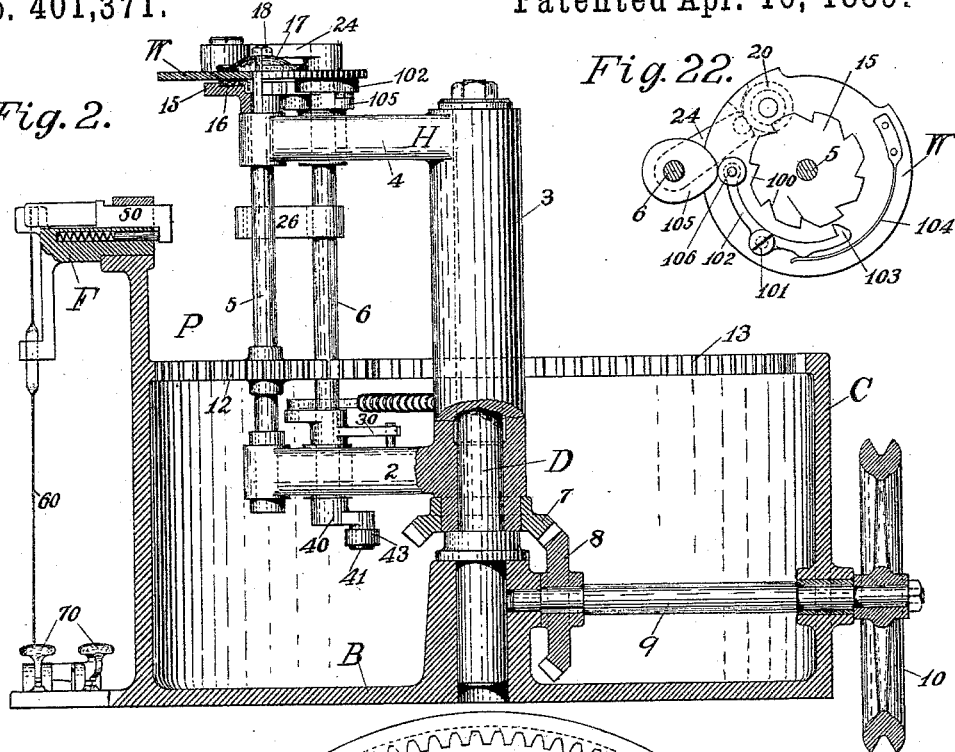
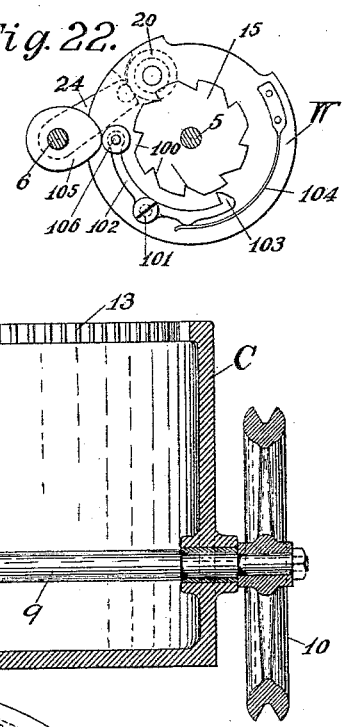
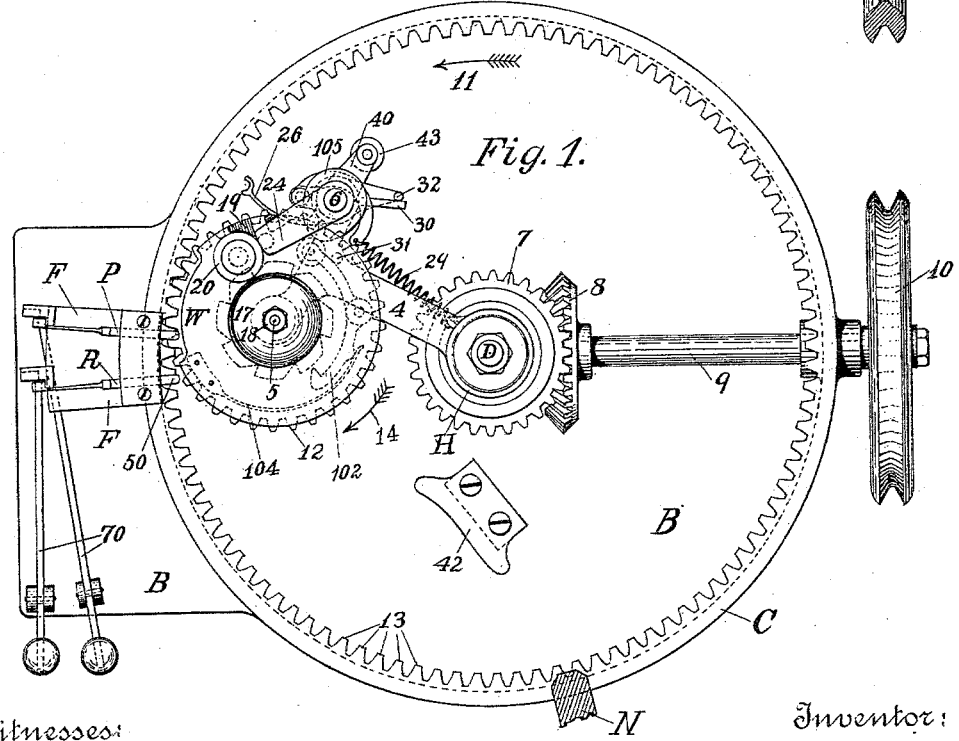
Witnesses:
Wilbur M. Stone.
Olaf Tyberg.
Inventor:
Francis H. Richards.

(No Model.) 4 Sheets—Sheet 2.

F. H. RICHARDS.
MECHANICAL MOVEMENT.

No. 401,371. Patented Apr. 16, 1889.

Witnesses:
Wilbur M. Stone.
Oluf Tyberg

Inventor:
Francis H. Richards.

(No Model.) 4 Sheets—Sheet 3.

F. H. RICHARDS.
MECHANICAL MOVEMENT.

No. 401,371. Patented Apr. 16, 1889.

Witnesses:
Wilbur M. Stone.
Oluf Tyberg.

Inventor:
Francis H. Richards.

(No Model.) 4 Sheets—Sheet 4.
F. H. RICHARDS.
MECHANICAL MOVEMENT.
No. 401,371. Patented Apr. 16, 1889.
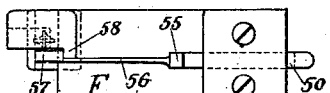
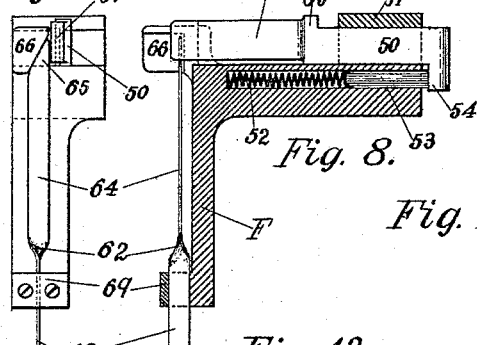
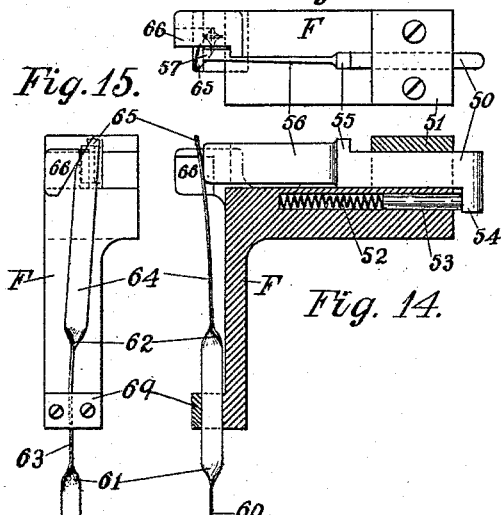
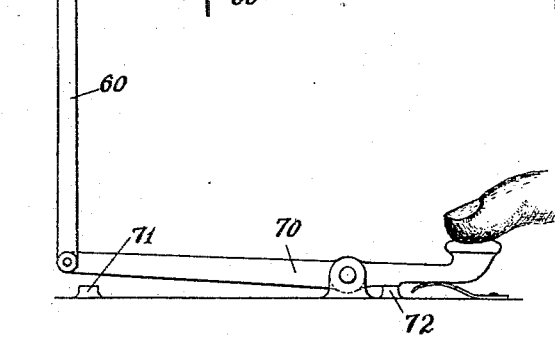
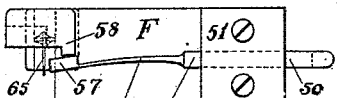
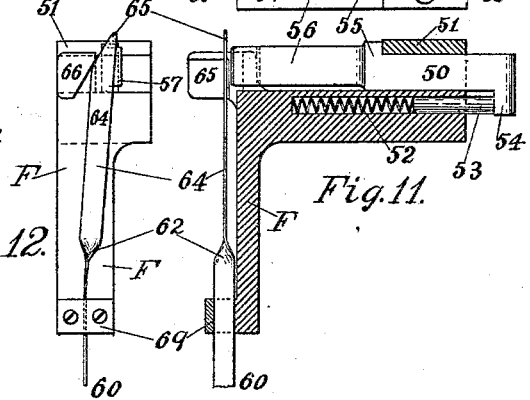
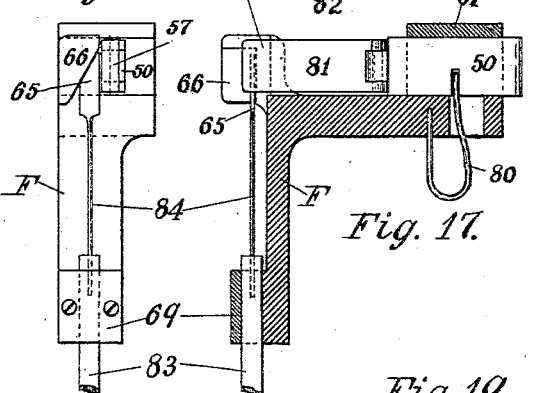
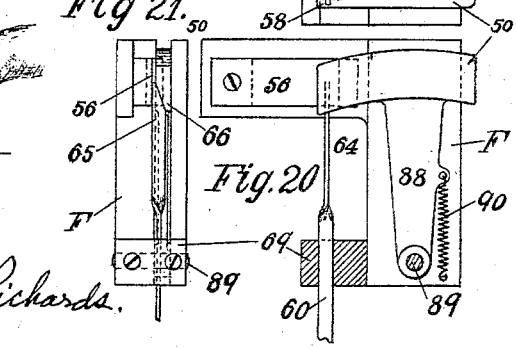
Witnesses: Wilbur M. Stone. Oluf Tyberg.
Inventor: Francis H. Richards.

UNITED STATES PATENT OFFICE.

FRANCIS H. RICHARDS, OF SPRINGFIELD, MASSACHUSETTS, ASSIGNOR TO DARIEN W. DODSON, OF WILKES-BARRÉ, PENNSYLVANIA.

MECHANICAL MOVEMENT.

SPECIFICATION forming part of Letters Patent No. 401,371, dated April 16, 1889.

Application filed November 15, 1886. Renewed May 2, 1888. Serial No. 272,531. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Mechanical Movements, of which the following is a specification.

This invention relates to mechanism for starting and stopping the revolution about its axis of a wheel having a continuous orbital movement, the object being to furnish an apparatus for so operating the type-wheels of a certain class of type-writing machines.

To this end the invention consists in certain improvements and combinations hereinafter set forth.

Figure 3:
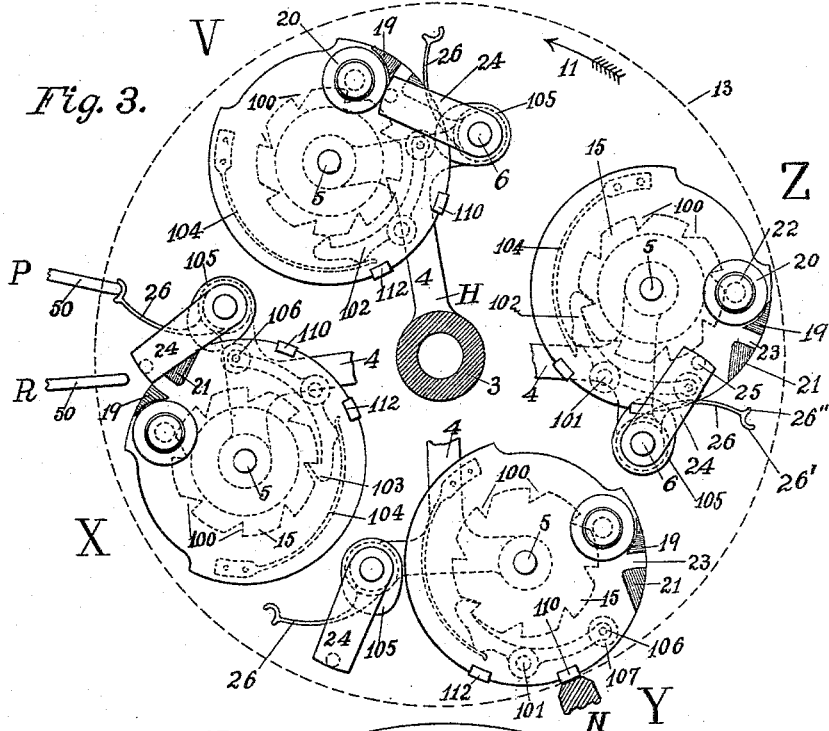
Figure 4:
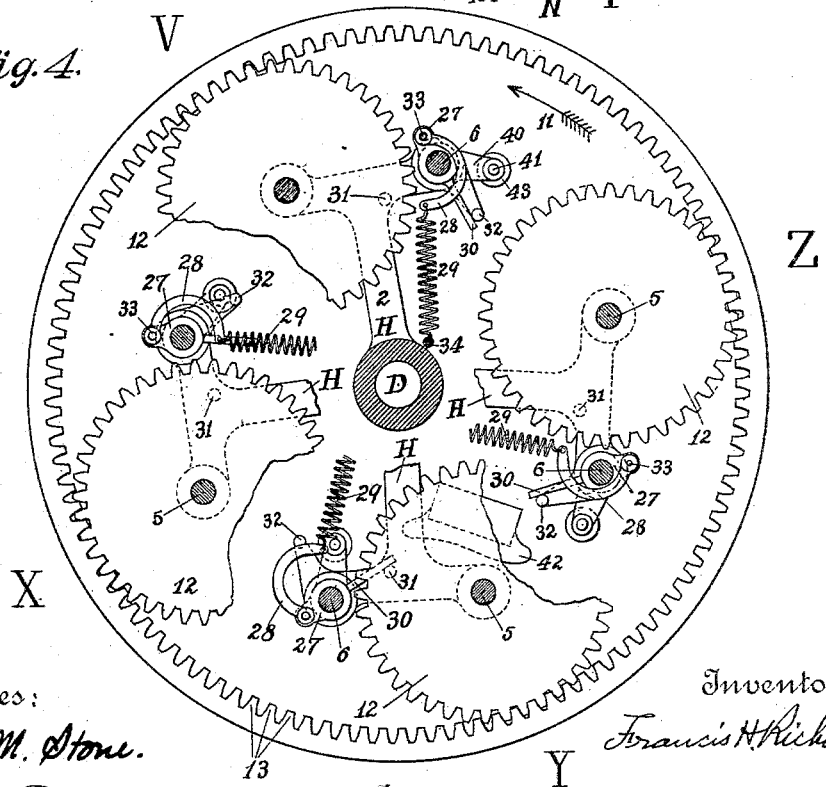
Figure 6:
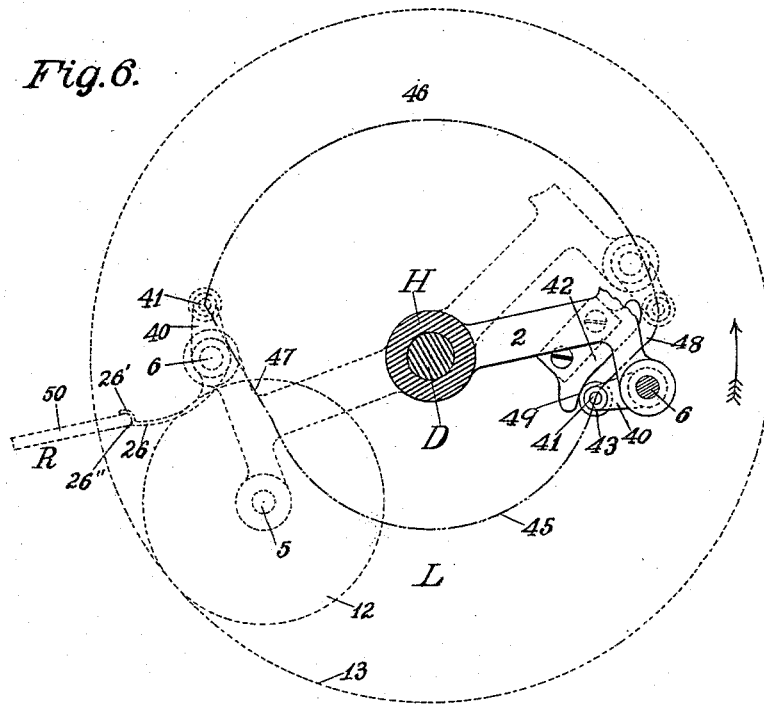
Figure 5:
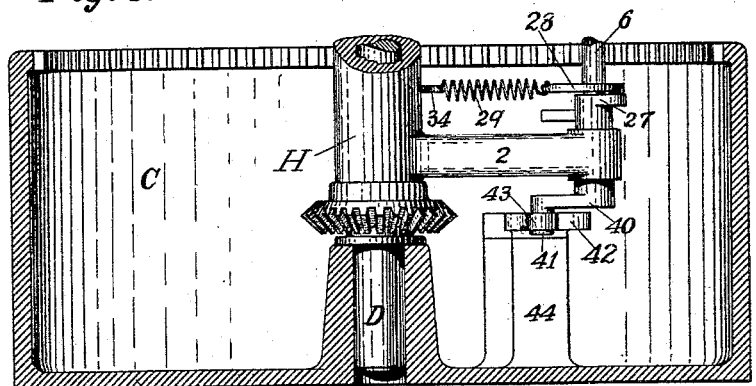
Figure 23:
Figure 24:
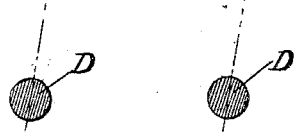

In the drawings accompanying and forming a part of this specification, Figure 1 is a plan view of an apparatus embodying my improvements. Fig. 2 is a front elevation, partially in section, of the same. Fig. 3 shows a top view of the type-wheel shaft and wheel in four successive positions, and illustrates the operation of the detent apparatus which is intermediate to said wheel and the starting latch or latches. Fig. 4 is a similar view of the lower part of said shaft, together with its driving-gear and the apparatus for resetting the detent apparatus. Fig. 5 is a side elevation of the latter apparatus. Fig. 6 is a top view and diagram illustrating the mode of operation of this apparatus. Figs. 7, 8, and 9 are respectively a top view, a side elevation partially in section, and a rear view (all drawn to an enlarged scale) of the preferred form of latch mechanism in its normal position—that is, set ready for use. Figs. 10, 11, and 12 are three similar views of this mechanism at the moment after the latch has been unhooked. Figs. 13, 14, and 15 are three similar views showing the parts as situated after the latch has been reset, but before the return of the tripping-rod. Figs. 16, 17, and 18 are three similar views showing certain modifications in the construction of the details of the same apparatus. Figs. 19, 20, and 21 illustrate further modifications in the construction and arrangement of the several parts of this apparatus. Fig. 22 is a plan view of the lower side of the wheel, showing devices for imparting thereto, after the same has been started, a positive movement. Figs. 23 and 24 illustrate, respectively, the construction and operation of the starting-arm in its simple and improved forms.

Similar characters designate like parts in all the figures.

My improvements comprise a shaft-carrying frame or turret, constructed and arranged to be revolved about a fixed axis by means of any suitable or convenient appliances, a frictionally-driven wheel carried on said frame, a wheel-stopping or detent apparatus also carried on said frame, and devices to unset and reset the detent apparatus. The framework for supporting those several portions of the mechanism may be the frame of some machine in which this mechanism may be incorporated, or it may consist of the parts shown in the drawings. These are base-plate B, circular wall C, post P, fixed stud D, and latch-frame F.

The shaft-carrying frame consists or may consist of a sleeve, 3, fitting freely on stud D, and two arms, of which the lower one is designated by 2 and the upper one by 4. These arms have each a bearing for a revolving shaft, 5, (whose length is not material, except that it fit the frame,) and for a rocking (or rotary) shaft, 6. On its lower end said frame (which as a whole is designated by H) carries a gear, 7, driven by a gear, 8, on driving-shaft 9, which shaft has its bearings in the frame-work and is driven by a pulley, 10, or otherwise, so as to turn said frame H in the direction of arrow 11, Figs. 1, 3, and 4.

Shaft 5 is revolved in its bearings during the movement of frame H by means of some suitable gearing. This may consist of the spur-wheel 12, fixed on said shaft, and meshing there with the internal teeth 13 on wall C. By this or similar means shaft 5 will be given a regular rotary motion (during such movement of frame H) in the direction of arrow 14. At its upper end (or elsewhere thereon) said shaft 5 has mounted thereon a wheel, W, the intermittent rotary movement of which during its orbital motion is, as before mentioned, the chief purpose of my present invention. Said wheel is shown mounted on its shaft by the following preferred means: A flange, 15, rigidly fixed on the shaft, supports a friction-washer, 16, usually of leather or the like, on which the said wheel rests. Above the wheel, which fits freely around shaft 5, a spring-washer, 17, is held down by an adjusting-nut, 18, these parts serving to adjust the pressure of the wheel on washer 16 for obtaining the required degree of friction to properly actuate said wheel.

In Figs. 3 and 4 at V, X, Y, and Z are shown four successive positions of the wheel W in its orbit and the corresponding steps in the operation of the detent apparatus. In Fig. 3 is shown the parts above, and in Fig. 4 those below, the upper edge of wall C, this mode of illustration having been adopted to prevent confusion of lines in the drawings.

The detent apparatus consists, first, of a stop on wheel W; second, a stop-arm on shaft 6, and, third, means by which the apparatus is reset after it has been unset. The stop on wheel W consists, essentially, of a fixed lug, 19; but in practice I prefer to employ in addition a roller, 20, and a reaction or safety stop, 21, set in opposition to stop 19. The roller 20, carried on stud 22, is preferably made of slightly-elastic material, or of some comparatively non-resonant metal. It strikes against the end of the stop-arm 24, when this arrests the motion of the wheel, and serves to reduce the friction while said arm is being swung outward. Between stops 19 and 21 there is a groove, 23, for the passage of a pin, 25, which projects downward from arm 24. By this means the liability, when the mechanism is run at a high speed, of the wheel being inaccurately started is much lessened.

In position V the detent apparatus is shown set and operating in opposition to the friction to restrain wheel W from turning with shaft 5. For unsetting the apparatus and thus allowing said wheel to start revolving, shaft 6 is provided with a starting-arm, 26, operated by a latch mechanism, which will be hereinafter more particularly described. In position X arm 24 is shown swung out to the point where it clears stop 19, and where wheel W starts. In position Y said arm is swung clear out, and in position Z, it is reset, ready to again stop the wheel. When thrown into either one of its extreme positions V and Y, said shaft and arm are for a time detained there by some detaining device. This may be a friction device applied to the shaft; but I prefer a spring of the kind commonly used in connection with reversible pawls, in planer-feeds, and in ratchet-drills. The arrangement of this device as shown in the drawings I have found to be suitable. This arrangement (shown best in Fig. 4) consists of the arm 27, fixed on shaft 6; a link, 28, connected at 33 to said arm and to the spring 29, which is attached to hook 34, and a stop-arm, 30, which strikes against pins 31 32 on arm 2 for limiting the motion of said shaft. The construction and arrangement of these parts should be such that a straight line from pin 33 to hook 34 will, approximately, pass as much to one side of shaft 6 in position V as it will to the other side in position Y.

For the purpose of resetting the detent apparatus, shaft 6 has a resetting-arm, 40, whereby it is operated by the resetting-cam 42. Said arm is ordinarily provided with a stud or pin, 41, carrying an anti-friction roller, 43, which rolls on the face of cam 42, this cam being supported on post 44, Fig. 5, or otherwise attached to the frame-work. The mode of operation of this particular device is illustrated by the diagram, Fig. 6. The dotted line L shows the path of the axis of roller 43 as it travels during the operation of the whole mechanism. While this is running idle that axis will run in a circle of the radius of arc 46; but on starting shaft 6 arm 40 is thrown inward, and point 41, Fig. 6, moves in along line 47 to the radius of arc 45. Here it remains until roll 43 strikes the resetting-cam at 49, when said point is thrown outward along line 48 to the above-mentioned arc 46, as is indicated by dotted lines in said figure.

The latch mechanism for operating shaft 6 through and by means of an arm thereon consists of a latch or bolt having a movement crosswise to the axis of, and crosswise to the axis of, the orbital movement of said shaft, and of devices for operating said latch. The bolt or latch, when thrown inward toward the central axis, is interposed in the path of the arm 26, and engages or strikes against the said arm as this swings past it, thus turning the shaft. Said latch may be constructed to slide or to oscillate; but of these two arrangements I prefer and have more fully illustrated the former. (If the latch is constructed to oscillate, it may be arranged to do so either in a horizontal plane or in a vertical plane, as shown in Figs. 19 to 21, inclusive, and hereinafter described.) In Figs. 1 and 2 duplicate latches P and R, together with their accessory parts, are shown; but I will describe them in detail in connection with the enlarged views, Figs. 7 to 15, inclusive.

The latch-frame F is slotted or grooved to receive a sliding latch, 50, held in place by cap 51. The latch is thrown forward (toward the right hand in Figs. 7, 8, 10, 11, 13, and 14) by a spring, 52, contained in the frame, and which acts through the sliding pin 53 against a projection, 54, formed on the latch, the motion of the latch being limited by some kind of stop, as 55, formed thereon, and striking against a fixed part, as cap 51. The rear end of the latch has a spring, 56, terminating in a hook, 57, that normally engages with the notch or projection 58 on the frame, as shown in Figs. 7 and 13. When that hook is forced off from the notch, as in Figs. 10, 11, and 12, the spring 52 throws out the latch, as shown in these figures—that is, the hook has a principal and a subordinate movement, the latter crosswise to the former.

Constructed and arranged as above described, or in some way equivalent thereto, the latch 50, when held back by the hook, is held normally in a state of tension or pressure, and when released is thrown forward with a free and instantaneous movement, is thrown forward by a spring or like power, which acts without restraint to complete said movement instantly. This feature permits the turret to be revolved at a comparatively high speed without interfering with the proper operation or coaction of the latch and starting-arm.

For unhooking the latch I employ a tripping-rod (guided in frame F at 69) whose principal movement is in a vertical direction, and whose upper end is capable of a subordinate movement in two directions—horizontally with the motion of the latch and crosswise thereto. The tripping-rod consists, as shown in the principal figures of drawings, in a flat rod or wire, 60, twisted at 61 62, so that the part 63 stands crosswise to part 64, this being for the purpose of rendering the wedge-shaped upper end, 65, yielding in two directions, one of which is shown in Fig. 12 and the other in Fig. 14. The wedge 65 stands normally between hook 57 and incline 66, as in Figs. 7, 8, and 9. If, now, the tripping-rod be forced up, as in Figs. 10, 11, and 12, the incline forces off the wedge, and this acts against the hook to push it off notch 58, thereby permitting the latch to be thrown forward, as is shown in these figures. The rod 60 may now be lowered, as in Fig. 9, and the latch rehooked in its former position; but as the frame H is or may be continuously revolving, it is possible, and even probable, that the latch will be returned by arm 26 before the tripping-rod can be lowered, and to prevent this interfering with the rehooking of the latch the said rod is constructed and arranged to be pressed back by the latch, (by hook 57 thereof,) as shown in Figs. 13 and 14. By this means the finger-key 70 is so connected with the latch that one stroke on the key (properly limited by stops 71 72) can produce but one movement of the latch, cannot keep the latch unhooked, and thereby repeat the operations of the whole mechanism. This detachment between the key and latch is often of the highest importance, especially when the key 70 is one of the keys of a type-writer, in which case such repeating would obviously be very objectionable.

The particular construction and arrangement of the latch mechanism may be much changed in various ways without materially altering the essential character thereof. Thus in Figs. 16 to 18, inclusive, a U-shaped spring, 80, is substituted for spring 52 and pin 53, and projection 54 is also omitted. The spring 56 is replaced by a hinged arm, 81, held toward notch 58 by spring 82, and the tripping-rod consists of a non-elastic slide, 83, having the spring-rod 84 terminating in the wedge 65. These and all similar changes I regard as merely immaterial modifications.

In Figs. 19 to 21, inclusive, the latch 50 is curved, and has an arm, 88, which is pivoted to the latch-frame at 89, the latch being thrown out by some kind of spring—as, for instance, the spiral spring 90. The arrangement of the spring and notch for hooking back the latch is the reverse of their arrangement in Figs. 7, 8, and 9—that is to say, the spring 56 is fixed to the frame instead of to the latch and the hook 57 catches onto the notch 58, which is now formed on the latch instead of on the frame, and the incline 66 is formed on the latch, the tripping-rod end 65 being reversed. It will be seen that this arrangement comprises the same elements as the former, and that these elements here co-operate in substantially the same manner for attaining the same result.

There is an additional device shown in the drawings, the object of which is to lock the wheel W to its shaft after it has been started by the friction, as before explained. For this purpose the flange 15 has formed therein notches 100, and wheel W has pivoted thereon at 101 a lever, 102, whose hook-shaped end 103 is fitted to engage said notches—as shown, for instance, in position Y, Fig. 3. Said lever is held with its hook thus engaged by a spring, 104, attached to the wheel; but normally the lever is held from such engagement by a cam, 105, on shaft 6, which cam acts on the forward end, 106, of the lever, this end being preferably furnished with a roller, 107, as shown. Cam 105 is so shaped that it permits the engagement of hook 103 with a notch, 100, just before the moment that arm 24 slips off stop 19, just before the starting of wheel W—as shown, for instance, in position X, Fig. 3. The notches 100, as shown, are shaped to hold in one direction only; but they and hook 103 may be formed to hold in both directions, if in any case this result be desirable.

In Figs. 1 and 3, N designates a platen or other stationary part against which it is required that certain specified points on wheel W shall be brought into contact during the revolution of said wheel. In Fig. 3 two such points on said wheel are designated by 110 and 112, respectively. The circumferential distance apart of these points corresponds with the distance apart in pitch-line 13 of the two latches P R, Fig. 3, and the distance between these latches and platen N corresponds with the location of said points on the wheel, due regard being had to the time required for the detent apparatus to release the wheel. Thus in position X the wheel is shown at the moment of being started by latch P, which determines the later arrival of point 110 at the platen, as in position Y. In like manner latch R determines the arrival of the other point, 112, at the same place, N. It will be understood that the number of said points and of the corresponding latches may be indefinitely increased.

Another feature (not yet described) of my invention resides in the construction and arrangement of the starting-arm 26, whereby this arm imparts to the shaft whereon it is fixed a controlled movement not essentially modified by the elasticity or momentum of the parts concerned in such movement. The latch 50 (see Fig. 23) when unhooked is thrown inward until it reaches a circle, 120, concentric to pitch-line 13, and the arm 26, when the detent apparatus is set, reaches outside of said circle. Consequently, as shaft 6 travels along in its orbit 121, the point 26' of said arm will strike said latch and be thrown around to the dotted position in said Fig. 23. Such would be the operation were the arm single-pointed and of the form substantially as there shown; but in practice, and more especially when the apparatus is working at a considerable speed, the first contact of the arm (when so constructed) with the latch serves to spring one or more of the parts sufficiently to cause a rebound or sudden starting of shaft 6, so that the arm will reach its said dotted position sooner than it should, the time varying with the construction and speed of the mechanism. This natural irregularity of operation is rendered still worse by the practical necessity which exists for making the starting-arm elastic or springy to reduce the force of the blow against the latch.

For the purpose of obviating that uncertainty of operation, I provide the arm 26 with a second point, 26'', on the front side thereof. (See Fig. 24.) This second point stands (when the detent apparatus is set) just within circle 120, so as to pass by the point of latch 50 before point 26' strikes the side thereof. Suppose, now, that the force of the blow reacts to turn shaft 6 too rapidly. Obviously the end of point 26'' will then travel in line 122, which is concentric to said shaft, and as this line crosses over the point of the latch said point will strike the latch and act as a stop to effectually prevent the said rebounding. The space or concavity between points 26' and 26'' forms a socket in which the end of the latch (preferably rounded, as shown) takes its bearing, while the arm is forcing the latch back to be locked, and this engagement of the latch and arm continues until the wheel W is properly started, after which event the movement of shaft 6 no longer requires to be positively controlled.

In some of the general views minor details have not always been designated by their reference-characters, owing to the complexity of the drawings; but all such parts will be readily understood from the figures in which they are most fully shown.

The operation of my improved mechanical movement, and especially of the details thereof, will have been understood from the drawings and the preceding description. When the operator wishes to bring either point, 110 or 112, in contact with platen N (frame H being revolving) he touches the key for unhooking the corresponding latch P or R, thereby uncatching spring 56, which allows the latch to be thrown out by spring 52, as at R, Figs. 3 and 6. In this position the end of the latch engages arm 26, when this arrives, as in Fig. 6, and is pushed back and rehooked, as before described. Arm 26 turns shaft 6 to release the wheel W, which then revolves with shaft 5 until again stopped by the detent apparatus, as also before described, during which revolution the selected point strikes the platen and passes on. This series of operations will be repeated as often as the key is struck, the speed of the mechanism being of course sufficient therefor.

It should be understood that this mechanical movement, and especially the several details thereof, are capable of modification in various ways and degrees, (other than the ways described,) after the manner of machines in general within the scope and limits of my invention.

Having thus described my invention, I claim—

1. The combination of a frictionally-mounted wheel having an orbital movement, a detent apparatus carried with said wheel and acting to restrain the axial rotation thereof, said apparatus having a starting-arm, substantially as described, and a latch adapted to be interposed in the path of said arm to unset said apparatus and thereby allow the starting of said wheel, all substantially as described.

2. The combination of a revolving shaft having an orbital movement, a wheel frictionally mounted on said shaft and having thereon a stop, a stop-arm carried by said wheel and acting against the stop thereof to restrain the axial rotation thereof, and mechanism operating to unset and reset said arm, all substantially as described.

3. The combination, with a shaft having an orbital movement and having a starting-arm, of a latch adapted to be interposed in the path of said arm, said latch being normally held back in a state of tension, and constructed and arranged to have, on being released, a free and instantaneous movement in said path, all substantially as described.

4. The combination of a shaft having an orbital movement and having thereon the starting-arm, and a latch having a movement crosswise to said orbital movement and adapted to be interposed in the path of and to engage with said arm, the arm being constructed to push back the latch, and the latch to turn the arm and shaft, substantially as described.

5. The combination of the reciprocating latch 50, having thereon the spring-catch operating to hold back said latch, and a tripping-rod operating in connection with an incline to unhook said catch, all arranged and operating substantially as shown and described.

6. The combination of the reciprocating latch, a spring-catch for holding back said latch, and a vertically-movable tripping-rod operating in connection with an incline to unhook said catch, the upper end of said rod having a movement in crosswise directions, all substantially as and for the purpose described.

7. The combination of a reciprocating latch having a longitudinal and a lateral movement, and a tripping-rod also having a longitudinal and a lateral movement, the longitudinal movement of the one being crosswise to the longitudinal movement of the other, substantially as and for the purpose described.

8. The combination, with the frame, as F, having a bearing for a reciprocating latch, incline 66, and notch 58, of a reciprocating latch having spring 56 and hook 57, and tripping-rod 60, all operating substantially as described.

9. The combination, in a mechanical movement of the class described, of a shaft having an orbital motion about an axis, and having thereon a starting-arm and a resetting-arm, a latch mechanism acting on said arm to turn said shaft in one direction, and a resetting-cam acting on said resetting-arm to afterward turn said shaft in the reverse direction during said orbital motion, substantially as described.

10. The combination, with a shaft having an orbital movement and adapted to have a turning movement about its own axis during its orbital movement, of a starting-arm fixed on said shaft and having the two points 26' and 26'', and a latch interposable in the path of the first point and taking its bearing in a concavity between the two points, substantially as and for the purpose described.

11. The combination, with a revolving shaft having the notched flange 15, of wheel W, frictionally mounted thereon and carrying a hooked lever, and a detent apparatus operating to restrain the rotary movement of said wheel and having cam 105, said apparatus and cam being operated to release the wheel and to permit the engagement of the hook with said flange, all substantially as and for the purpose described.

FRANCIS H. RICHARDS.

Witnesses:
DARIEN W. DODSON,
WILBUR M. STONE.